United States Patent

Furukawa et al.

[11] Patent Number: 5,568,239
[45] Date of Patent: Oct. 22, 1996

[54] STAINPROOFING OIL FOR A HEAT FIXING ROLLER

[75] Inventors: Yutaka Furukawa; Seisaku Kumai; Mami Yoshino, all of Yokohama, Japan

[73] Assignee: Asahi Glass Company Ltd., Tokyo, Japan

[21] Appl. No.: 412,221

[22] Filed: Mar. 27, 1995

Related U.S. Application Data

[62] Division of Ser. No. 296,246, Aug. 25, 1994, abandoned.

[30] Foreign Application Priority Data

| Aug. 27, 1993 | [JP] | Japan | 5-235664 |
| Apr. 13, 1994 | [JP] | Japan | 6-074973 |
| Jul. 19, 1994 | [JP] | Japan | 6-166952 |

[51] Int. Cl.⁶ .................................................. G03G 15/20
[52] U.S. Cl. .......................... 355/284; 355/285; 355/290; 118/DIG. 1
[58] Field of Search .......................... 355/282, 285, 355/290, 295, 284; 118/DIG. 1

[56] References Cited

U.S. PATENT DOCUMENTS

| 3,642,626 | 2/1972 | Christian | 528/42 |
| 4,254,733 | 3/1981 | Namiki | 118/60 |
| 4,970,559 | 11/1990 | Miyabayashi | 355/290 |
| 4,980,440 | 12/1990 | Kendziorski et al. | 528/42 |
| 4,985,526 | 1/1991 | Kishita et al. | 528/42 |
| 4,988,758 | 1/1991 | Fukuda et al. | 524/588 |
| 5,327,202 | 7/1994 | Nami et al. | 355/282 |
| 5,354,612 | 10/1994 | Miyabayashi | 428/331 |
| 5,364,697 | 11/1994 | Miyabayashi | 428/323 |

FOREIGN PATENT DOCUMENTS

| 2716203 | 10/1977 | Germany. |
| 5-97870 | 4/1993 | Japan. |

*Primary Examiner*—Mark D. Sweet
*Attorney, Agent, or Firm*—Oblon, Spivak, McClelland, Maier & Neustadt, P.C.

[57] ABSTRACT

A stainproofing oil for a heat fixing roller, which consists essentially of a fluorosilicone compound having a silicon atom to which a monovalent fluorine-containing group selected from the formulae (1) to (3) is bonded:

$$R_f^1-X^1- \quad (1)$$

$$R_f^2-X^2-O-X^3- \quad (2)$$

$$R_f^3-X^4-O-X^5- \quad (3)$$

wherein $R_f^1$ is a monovalent polyfluorohydrocarbon group, $R_f^2$ is a monovalent polyfluoroalkyl group containing an ether oxygen atom, $R_f^3$ is a monovalent polyfluorohydrocarbon group, and each of $X^1$ to $X^5$ independently is a bivalent hydrocarbon group.

8 Claims, No Drawings

STAINPROOFING OIL FOR A HEAT FIXING ROLLER

This application is a Division of application Ser. No. 08/296,246, filed on Aug. 25, 1994, now abandoned.

The present invention relates to a stain proofing fluorosilicone oil for a heat fixing roller used in contact heat fixing apparatus such as a dry system electrophotographic copying machine and a printing machine.

With an electrophotographic copying machine, copying is carried out usually in such a manner that a pigment-containing thermoplastic resin powder (hereinafter referred to as a toner) is used to electrophotographically form an image on a photosensitive material, and the image is then transferred to a transfer paper, whereupon the toner is fixed. As a method for fixing the toner, a contact heat fixing system is employed in many cases. The contact heat fixing system is a method wherein a heat fixing roller and a pressure roller are brought in contact with each other under a certain prescribed pressure, and the transfer paper is permitted to pass between the two rollers, whereby the toner will melt and fix to the transfer paper.

Heretofore, silicone rubber has been used as the material for the pressure roller and the heat fixing roller. Silicone rubber makes the roller surface elastic and thus has a merit that an excellent image quality can be thereby obtained. Further, heretofore, it has been common to coat a heat resistant elastic material on the surface of a pressure roller or to coat a heat resistant releasing material on the surface of a heat fixing roller in order to make a transfer paper readily releasable from the pressure roller or the heat fixing roller. As such a heat resistant releasing material, a fluorine resin such as polytetrafluoroethylene (hereinafter referred to as PTFE) or a copolymer of tetrafluoroethylene with perfluoroalkylvinyl ether (hereinafter referred to as PFA) is known. A heat fixing roller coated with such material also has an elastic surface and rarely crushes a non-fixed toner, and thus has a merit that an excellent image quality can thereby be obtained.

However, there is a problem that when the toner is melt press bonded to the transfer paper by the heat fixing roller, a part of the toner supported on the first transfer paper sheet will deposit on the surface of the heat fixing roller and, when the second transfer paper sheet is brought in contact with the heat fixing roller, will be transferred to the second transfer paper sheet, and at the same time, a part of the toner from the second transfer paper sheet will deposit on the heat fixing roller and will then be transferred to the third transfer paper sheet. In the field of printing technology, this phenomenon is called an offset phenomenon, which is an undesirable phenomenon in the process of fixing the toner.

To prevent this phenomenon, the heat fixing roller is usually coated with a silicone oil consisting of a linear dimethyl silicone having trimethylsilyl groups at the terminals or a linear methylphenylsilicone having trimethylsilyl groups at the terminals.

However, when such a conventional silicone oil is coated to a heat fixing roller having a silicone rubber surface, there has been a problem that the roller undergoes swelling. When the conventional silicone oil is coated on a heat fixing roller having a surface of a fluorine resin such as PTFE or PFA, there has been a problem that wettability of the roller surface is poor, since the surface tension of the silicone oil is higher than the critical surface tension of the fluorine resin, and uniform coating can hardly be attained.

The present invention has been made to solve the above-mentioned problems and to provide a stainproofing oil for a heat fixing roller.

That is, the present invention provides a stainproofing oil for a heat fixing roller, which consists essentially of a fluorosilicone compound having a silicon atom to which a monovalent fluorine-containing group selected from the formulae (1) to (3) is bonded:

$$R_f^1-X^1- \tag{1}$$

$$R_f^2-X^2-O-X^3- \tag{2}$$

$$R_f^3-X^4-O-X^5- \tag{3}$$

wherein $R_f^1$ is a monovalent polyfluorohydrocarbon group, $R_f^2$ is a monovalent polyfluoroalkyl group containing an ether oxygen atom, $R_f^3$ is a monovalent polyfluorohydrocarbon group, and each of $X^1$ to $X^5$ independently is a bivalent hydrocarbon group.

Now, the present invention will be described in detail with reference to the preferred embodiments.

In the formula (1), $R_f^1$ is a monovalent polyfluorohydrocarbon group. In the present invention, "a polyfluorohydrocarbon group" means a group having at least two hydrogen atoms of a hydrocarbon group substituted by fluorine atoms. When unsubstituted hydrogen atoms are present, such hydrogen atoms may be substituted by chlorine atoms, but in the present invention, they are preferably unsubstituted. The number of fluorine atoms in the polyfluorohydrocarbon group is preferably such that the percentage of (the number of fluorine atoms in the polyfluorohydrocarbon group)/(the number of total hydrogen atoms in the corresponding hydrocarbon group having the same number of carbon atoms as in the polyfluorohydrocarbon group) is at least 60%, more preferably at least 80%.

The hydrocarbon group may be an aromatic hydrocarbon group or an aliphatic hydrocarbon group. The aromatic hydrocarbon group may, for example, be a phenyl group or a naphthyl group. Further, the aromatic hydrocarbon group may have at least one, preferably only one, lower alkyl group such as a methyl group or an ethyl group bonded thereto. On the other hand, the aliphatic hydrocarbon group may, for example, be an alkyl group, an alkenyl group or an alkynyl group, preferably an alkyl group. Among them, an aliphatic hydrocarbon group is preferred, and an alkyl group is particularly preferred, as the hydrocarbon group of the present invention. Namely, as the polyfluorohydrocarbon group in the present invention, a polyfluoroalkyl group is preferred. The polyfluoroalkyl group is preferably a perfluoroalkyl group having all of hydrogen atoms of the alkyl group substituted by fluorine atoms.

In the formula (1), $R_f^1$ is a monovalent polyfluorohydrocarbon group, preferably a monovalent polyfluoroalkyl group, more preferably a perfluoroalkyl group. When $R_f^1$ is a monovalent polyfluoroalkyl group, the carbon number is preferably from 1 to 18, more preferably from 4 to 16, most preferably from 6 to 14. When the carbon number of the polyfluoroalkyl group is large, the surface tension of the oil tends to decrease, and the volatility of the fluorosilicone oil tends to decrease, such being practically preferred. On the other hand, the carbon number being too large is undesirable from the economical viewpoint. Further, the polyfluoroalkyl group may be a combination of two or more alkyl groups having different carbon numbers, and in such a case, the average carbon number is preferably from 4 to 16, more preferably from 6 to 14.

Further, the polyfluoroalkyl group may be of a linear structure or a branched structure. However, a linear structure is preferred. In the case of a branched structure, a structure is preferred in which the carbon number of the branched portion is from about 1 to 3, and the branched portion is present at a terminal portion.

$R_f^1$ includes the following specific examples. The specific examples include the respective structural isomers.

$C_4F_9$—[structural isomers such as $CF_3$ $(CF_2)_3$—, $(CF_3)_2CFCF_2$—, $(CF_3)_3CF$— and $CF_3CF_2CF(CF_3)$—], $C_5F_{11}$—[structural isomers such as $CF_3(CF_2)_4$—, $(CF_3)_2CF(CF_2)_2$—, $(CF_3)_3CFCF_2$— and $CF_3(CF_2)_2CF(CF_3)$—], $C_6F_{13}$—[structural isomers such as $CF_3(CF_2)_2C(CF_3)_2$—], $C_8F_{17}$—, $C_{10}F_{21}$—, $C_{12}F_{25}$—, $C_{14}F_{29}$—, $C_{16}F_{31}$—, $C_{18}F_{37}$—, $(CF_3)_2CFC_sF_{2s}$—(wherein s is an integer of from 1 to 15), $HC_tF_{2t}$—(wherein t is an integer of from 1 to 18), a tetrafluorophenyl group, a 3-trifluoromethylphenyl group, and a 1,3-ditrifluoromethylphenyl group.

In the formula (1), $X^1$ is a bivalent hydrocarbon group. In the present invention, "a bivalent hydrocarbon group" may, for example, bean alkylene group or a phenylene group. Among them, an alkylene group is preferred as the bivalent hydrocarbon group of the present invention. Namely, $X^1$ is preferably an alkylene group, more preferably —$(CH_2)_p$— wherein p is an integer of from 1 to 10, preferably an integer of from 2 to 4.

The above-mentioned formula (1) preferably represents a structure of the formula (4), wherein $R_f^1$ is a linear perfluoroalkyl group, and $X^1$ is an alkylene group:

$$CF_3(CF_2)_n-X_6- \quad (4)$$

wherein n is an integer of from 0 to 17, preferably an integer of from 3 to 13, more preferably an integer of from 7 to 11, and $X^6$ is a $C_{1-10}$ alkylene group, preferably a $C_{2-4}$ alkylene group.

Further, the formula (4) may represent a combination of at least two groups having different values for n. In such a case, the average value of n is preferably from 4 to 16, more preferably from 6 to 14.

Specific examples of the formula (4) will be given below, but the formula (4) is not limited to such specific examples.
$CF_3(CF_2)_3(CH_2)_2$—,
$CF_3(CF_2)_4(CH_2)_2$—,
$CF_3(CF_2)_3(CH_2)_3$—,
$CF_3(CF_2)_3(CH_2)_4$—,
$CF_3(CF_2)_3(CH_2)_2$—,
$CF_3(CF_2)_7(CH_2)_2$—,
$CF_3(CF_2)_7(CH_2)_2$—,
$CF_3(CF_2)_7(CH_2)_4$—,
$CF_3(CF_2)_8(CH_2)_2$—,
$CF_3(CF_2)_9(CH_2)_2$—,
$CF_3(CF_2)_{11}(CH_2)_2$—,
$CF_3(CF_2)_{13}(CH_2)_2$—,
$CF_3(CF_2)_{13}(CH_2)_2$—.

The monovalent fluorine-containing group bonded to the silicon atom of the fluorosilicone compound of the present invention may be of the formula (2):

$$R_f^2-X_2-O-X_3- \quad (2)$$

wherein $R_f^2$, $X^2$ and $X^3$ are as defined above $R_f^2$ in the formula (2) is a monovalent polyfluoroalkyl group having an ether oxygen atom, which is a group having one or more carbon atoms of a polyfluoroalkyl group substituted by an ether oxygen atom.

$R_f^2$ is preferably a group containing an oxyfluoroalkylene moiety, more preferably a group containing an oxyperfluoroalkylene moiety. Further preferably, $R_f^2$ is a group containing an oxyperfluoroalkylene group and having perfluoroalkyl groups at the terminals. The oxyperfluoroalkylene moiety may, for example, be oxyperfluoromethylene, oxyperfluoroethylene, oxyperfluoropropylene or oxyperfluorobutylene.

Specific examples of $R_f^2$ will be given below, but $R_f^2$ is not limited to such specific examples. In the following formulas, u is an integer of from 1 to 10, v is an integer of from 1 to 11, and w is an integer of from 1 to 11.
$CF_3(CF_2)_4OCF(CF_3)$—,
$F[CF(CF_3)CF_2O]_uCF(CF_3)$—,
$F(CF_2CF_2CF_2O)_vCF_2CF_2$—,
$F(CF_2CF_2O)_wCF_2CF_2$—.

$x^2$ and $x^3$ in the formula (2) may be the same or different and independently represent a bivalent hydrocarbon group. Each of $X^2$ and $X^3$ is preferably an alkylene group, more preferably an alkylene group of the formula —$(CH_2)_q$— wherein q is an integer of from 1 to 10, preferably an integer of from 1 to 4.

The formula (2) preferably represents a structure of the formula (5), wherein $R_f^2$ is a group having an oxyperfluoropropylene moiety, and each of $X^2$ and $X^3$ is an alkylene group:

$$F[CF(CF_3)CF_2O]_mCF(CF_3)-X^7-O-X^8- \quad (5)$$

wherein m is an integer of from 1 to 10, preferably an integer of from 1 to 6, and each of $X^7$ and $X^8$ independently is a $C_{1-10}$ alkylene group, preferably a $C_{1-4}$ alkylene group.

The formula (5) may represent a combination of two or more groups having different values for m. In such a case, the average value of m is preferably from 1 to 10, more preferably from 1 to 6. Specific examples of the formulae (2) and (5) will be given below, but the formulae are not limited to such specific examples.
$F[CF(CF_3)CF_2O]_2CF(CF_3)CH_2O(CH_2)_3$—,
$F[CF(CF_3)CF_2O]_4CF(CF_3)CH_2O(CH_2)_3$—,
$F(CF_2CF_2CF_2O)_2CF_2CF_2CH_2O(CH_2)_3$—,
$F(CF_2CF_2O)_2CF_2CF_2CH_2O(CH_2)_3$—.

Further, the monovalent fluorine-containing group bonded to the silicon atom of the fluorosilicone compound of the present invention may be of the formula (3):

$$R_f^3-X^4-O-X^5- \quad (3)$$

wherein $R_f^3$, $X^4$ and $X^5$ are as defined above $R_f^3$ in the formula (3) is the same monovalent polyfluorohydrocarbon group as for $R_f^1$. The structure of $R_f^3$ is the same as that of $R_f^1$, and its preferred structure is also the same as the preferred structure of $R_f^1$.

$X^4$ and $X^5$ in the formula (3) may be the same or different and independently represent a bivalent hydrocarbon group. Each of $X^4$ and $X^5$ is preferably an alkylene group, more preferably an alkylene group of the formula —$(CH_2)_r$— wherein r is an integer of from 1 to 10, preferably an integer of from 1 to 4.

The formula (3) preferably represents a structure of the formula (6), wherein $R_f^3$ is a linear perfluoroalkyl group, and each of $X^9$ and $X^{10}$ is an alkylene group.

$$CF_3(CF_2)_k-X^9-O-X^{10}- \quad (6)$$

wherein k is an integer of from 0 to 17, preferably an integer of from 3 to 16, more preferably an integer of from 6 to 12, and each of $X^9$ and $X^{10}$ independently is a $C_{1-10}$ alkylene group, preferably a $C_{2-4}$ alkylene group.

The formula (6) may represent a combination of two or more groups having different values for k. In such a case, the average value of k is preferably from 3 to 16, more preferably from 6 to 14.

Specific examples of the formula (6) will be given below, but the formula (6) is not limited to such specific examples.

CF$_3$(CF$_2$)$_3$—(CH$_2$)$_2$—O—(CH$_2$)$_3$—,
CF$_3$(CF$_2$)$_3$—(CH$_2$)$_2$—O—(CH$_2$)$_3$—,
CF$_3$(CF$_2$)$_7$—(CH$_2$)$_2$—O—(CH$_2$)$_3$—,
CF$_3$(CF$_2$)$_7$—(CH$_2$)$_2$—O—(CH$_2$)$_2$—,
CF$_3$(CF$_2$)$_7$—(CH$_2$)$_2$—O—(CH$_2$)$_4$—,
CF$_3$(CF$_2$)$_9$—(CH$_2$)$_2$—O—(CH$_2$)$_3$—,
CF$_3$(CF$_2$)$_{11}$—(CH$_2$)$_2$—O—(CH$_2$)$_3$—,

The fluorosilicone compound of the present invention has a feature that it has a silicon atom to which at least one monovalent fluorine-containing group selected from the above formulae (1) to (3) is bonded.

The fluorosilicone compound of the present invention is a compound wherein in an organosiloxane unit as a polymer unit of a silicone compound, at least one organic group bonded to the silicon atom of the organosiloxane unit is the above monovalent fluorine-containing group. In the following description, the unit wherein at least one organic group of the organosiloxane unit is a monovalent fluorine-containing group selected from the formulae (1) to (3), will be referred to as a fluorinated siloxane unit. The monovalent fluorine-containing group is preferably selected from the formulae (4) to (6), more preferably the formula (4). Particularly preferred is a fluorine-containing group of the formula (4) wherein n is from 6 to 14, since such a group is excellent in the ability to lower the surface tension of the oil.

The fluorinated siloxane unit may, for example, be $(R_f^4)R^1SiO_{2/2}$, $(R_f^5)SiO_{3/2}$ or $(R_f^6)(R_f^7)SiO_{2/2}$. Here, each of $R_f^4$ to $R_f^7$ is a fluorine-containing group selected from the formulae (1) to (3), and $R_f^6$ and $R_f^7$ may be the same or different. $R^1$ is a monovalent hydrocarbon group, which may be a monovalent aliphatic hydrocarbon group or a monovalent aromatic hydrocarbon group. $R^1$ is preferably a lower alkyl group such as a methyl group or an ethyl group, or a phenyl group or a phenyl group having at least one substituent.

The fluorosilicone compound of the present invention is preferably a polymer which contains, in addition to the fluorinated siloxane units, other organosiloxane units (hereinafter referred to as non-fluorinated siloxane units). Such non-fluorinated siloxane units may be represented by the general formula $R^2R^3SiO_{2/2}$ or $R^4SiO_{3/2}$. Here, each of $R^2$ to $R^4$ independently is a monovalent hydrocarbon group. $R^2$ and $R^3$ may be the same or different. Each of $R^2$ to $R^4$ may be a monovalent aliphatic hydrocarbon group or a monovalent aromatic hydrocarbon group. In the case of the monovalent aliphatic hydrocarbon group, a lower alkyl group is preferred, and particularly preferred is a methyl group or an ethyl group. In the case of the monovalent aromatic hydrocarbon group, a phenyl group or a phenyl group having at least one substituent is preferred.

The structure of the fluorosilicone compound in the present invention may be any structure in which the above fluorinated siloxane units and optionally non-fluorinated siloxane units are connected in a linear, branched, partially grating or cyclic structure. However, in the case of a branched or partially grating structure, the fluorosilicone compound tends to be solid in many cases, and in the case of a cyclic structure, the boiling point of the fluorosilicone compound tends to be so low that it is likely to evaporate. Therefore, the linear structure is preferred.

In a case where the fluorosilicone compound is of a linear or branched structure, the chain terminal siloxane unit may, for example, be $R^5R^6R^7SiO_{1/2}$, $R^8R^9R_f^8SiO_{1/2}$, $R^{10}R_f^9R_f^{10}SiO_{1/2}$ or $R_f^{11}R_f^{12}R_f^{13}SiO_{1/2}$. From the viewpoint of e.g. easiness for the synthesis, $R^5R^6R^7SiO_{1/2}$ is preferred. Here, each of $R_f^8$ to $R_f^{13}$ is a monovalent fluorine-containing group selected from the formulae (1) to (3). Each of $R^5$ to $R^{10}$ independently is a monovalent hydrocarbon group, which may be a monovalent aliphatic hydrocarbon group or a monovalent aromatic hydrocarbon group, preferably a monovalent aliphatic hydrocarbon group. As the monovalent aliphatic hydrocarbon group, a lower alkyl group is preferred, and particularly preferred is a methyl group or an ethyl group. As the monovalent aromatic hydrocarbon group, a phenyl group is preferred.

The chain terminal siloxane unit is preferably $R^5R^6R^7SiO_{1/2}$ wherein $R^5$ $R^6$ $R^7$ and are the same, more preferably $R^5R^6R^7SiO_{1/2}$ wherein all of $R^5$ to $R^7$ are methyl groups or ethyl groups.

The molecular weight of the fluorosilicone compound of the present invention is preferably within a range of from about $10^3$ to $10^{5.}$ If the molecular weight is too high, the viscosity of the fluorosilicone compound becomes high, whereby wettability is likely to be impaired when it is coated to the surface of the heat fixing roller. On the other hand, if the molecular weight is too low, the boiling point becomes low, whereby the oil is likely to evaporate, and the viscosity becomes low, so that the oil is likely to flow out from the surface of the heat fixing roller. The viscosity of the fluorosilicone compound is preferably from 50 to 1,000 cP, more preferably from 105 to 500 cP, in view of efficiency for coating.

Further, if the content of fluorine atoms in the fluorosilicone compound is too small, deterioration in the stainproofing ability is observed. Therefore, in a usual case, the content of fluorine atoms in a molecule is preferably at least about 15 wt %. On the other hand, it is not economical to increase the content of fluorine atoms too much. Therefore, in a usual case, the content of fluorine atoms in a molecule is at most about 90 wt %.

As the fluorosilicone compound of the present invention, the one having the formula (7) is particularly preferred:

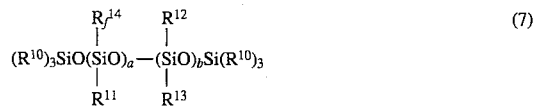

wherein $R^{10}$ is a lower alkyl group, each of $R^{11}$ to $R^{13}$ independently is a lower alkyl group or a monovalent aromatic hydrocarbon group, a is an integer of at least 1, b is an integer of 0 or at least 1, and $R_f^{14}$ is a monovalent fluorine-containing group selected from the above-mentioned formulae (1) to (3).

$R^{10}$ in the formula (7) is a lower alkyl group, and particularly preferred is a methyl group. $R^{11}$, $R^{12}$ and $R^{13}$ may be the same or different and each represents a lower alkyl group or a monovalent aromatic hydrocarbon group, preferably a methyl group or a phenyl group.

$R^{10}$ to $R^{13}$ in the formula (7) are preferably the same. Particularly preferred is a case wherein all of $R^{10}$ to $R^{13}$ are methyl groups.

$R_f^{14}$ in the formula (7) is a monovalent fluorine-containing group selected from the formulae (1) to (3), preferably a monovalent fluorine-containing group selected from the formulae (4) to (6), particularly preferably a monovalent fluorine-containing group of the formula (4), since the compound will thereby be excellent in the heat resistance. Further, in a case where $R_f^{14}$ is a monovalent fluorine-containing group of the formula (4), two or more groups having different numbers for n may be present in the same compound.

Further, in the formula (7), a is an integer of at least 1, and b is an integer of 0 or at least 1, preferably an integer of at least 1. The molecular weight of the compound of the formula (7) is preferably within a range of from $10^3$ to $10^6$, more preferably from $5 \times 10^3$ to $15 \times 10^3$. Therefore, in a usual case, $5 \leq a+b \leq 1,400$, preferably $20 \leq a+b \leq 400$. Further, it is preferred to select a and b so that the content of fluorine atoms in the formula (7) will be within a range of from 15 to 90 wt %, preferably from 15 to 70 wt %.

The fluorosilicone compound of the formula (7) may be of either structure of a block polymer or a random polymer. This is true also for the following fluorosilicone compound. The fluorosilicone compound of the formula (7) can be prepared by conventional methods. For example, it can be prepared by a method of ring-opening polymerization of a corresponding cyclic siloxane with an acid or alkali, or by a method of hydrolyzing a corresponding dichlorosilane, followed by condensation polymerization with an acid or alkali. As the cyclic siloxane, a cyclic trisiloxane or tetrasiloxane is preferred from the viewpoint of easy polymerization.

Specific examples of the fluorosilicone compound of the formula (7) will be given below, but it is not limited by such specific examples. In the following formulas, a and b are as defined above.

$(CH_3)_3SiO[(CH_3)(C_6F_{13}C_2H_4)SiO]_a[(CH_3)_2SiO]_bSi(CH_3)_3$, $(CH_3)_3SiO[(CH_3)(C_8F_{17}C_2H_4)SiO]_a[(CH_3)_2SiO]_bSi(CH_3)_3$, $(CH_3)_3SiO[(CH_3)(C_{10}F_{21}C_2H_4)SiO]_a[(CH_3)_2SiO]_bSi(CH_3)_3$, $(CH_3)_3SiO[(CH_3)(C_{12}F_{25}C_2H_4)SiO]_a[(CH_3)_2SiO]_bSi(CH_3)_3$, $(CH_3)_3SiO[(CH_3)(C_{14}F_{29}C_2H_4)SiO]_a[(CH_3)_2SiO]_bSi(CH_3)_3$, $(CH_3)_3SiO[(CH_3)(C_{14}F_{29}C_2H_4)SiO]_a[(CH_3)_2SiO]_bSi(CH_3)_3$, $(CH_3)_3SiO[(CH_3)(C_8F_{17}C_3H_6)SiO]_a[(CH_3)_2SiO]_bSi(CH_3)_3$, $(CH_3)_3SiO[(CH_3)(C_8F_{17}C_4H_8)SiO]_a[(CH_3)_2SiO]_bSi(CH_3)_3$, $(CH_3)_3SiO[(CH_3)(C_8F_{17}C_2H_4OC_3H_6)SiO]_a[(CH_3)_2SiO]_bSi(CH_3)_3$, $(CH_3)_3SiO[(CH_3)(C_{10}F_{21}C_3H_6)SiO]_a[(CH_3)_2SiO]_bSi(CH_3)_3$, $(CH_3)_3SiO[(CH_3)(C_{10}F_{21}C_4H_6)SiO]_a[(CH_3)_2SiO]_bSi(CH_3)_3$, $(CH_3)_3SiO[(CH_3)(C_{10}F_{21}C_2H_4OC_3H_5)SiO]_a[(CH_3)_2SiO]_bSi(CH_3)_3$, $(CH_3)_3SiO\{(CH_3)[F(CF(CF_3)CF_2O)_2CF(CF_3)CH_2OCH_2CH_2]SiO\}_a[(CH_3)_2SiO]_bSi(CH_3)_3$.

The above fluorosilicone compound is used alone or with an addition of an additive, if desired, as a stainproofing oil for a heat fixing roller. In a usual case, the stainproofing oil for a heat fixing roller is preferably used alone. The stainproofing oil for a heat fixing roller of the present invention is applied to the surface of a heat fixing roller to impart a stainproofing property to the roller. The amount to be applied to the heat fixing roller is not particularly limited. However, if it is too much, there will be a problem that the stainproofing oil will attach excessively to e.g. copy paper. On the other hand, if it is too small, there will be a problem that the stainproofing effect will be low. In a usual case, the fluorosilicone oil of the present invention is contacted continuously with a coating roller to deposit the fluorosilicone oil on the surface of the coating roller, and the coating roller is further contacted with a second coating roller, whereupon the second coating roller is contacted with the heat fixing roller to continuously supply the fluorosilicone oil to the surface of the heat fixing roller. The amount of the fluorosilicone oil to be applied is optionally changed depending upon e.g. the type of the machine.

The heat fixing roller to which the fluorosilicone compound of the present invention may be applied, is not limited to a heat fixing roller of a copy machine, and it is useful also for e.g. a printing machine.

The material of the heat fixing roller to which the silicone oil of the present invention is applied, is not particularly limited. It may be applied to any heat fixing roller made of conventional material. It is particularly preferred to apply the silicone oil of the present invention to a heat fixing roller having a silicone rubber surface or to a heat fixing roller having a surface of a fluorine resin such as PTFE or PFA, since it can be applied uniformly without swelling the roller. The heat fixing roller having a silicone rubber surface or a fluorine resin surface may be a heat fixing roller having its surface coated with a silicone rubber or a fluorine resin or the one wherein the roller itself is made of a silicone rubber.

Now, the present invention will be described in further detail with reference to Examples. However, it should be understood that the present invention is by no means restricted by such specific Examples.

PREPARATION EXAMPLE 1

A 200 cc four-necked flask equipped with a stirrer and thermometer was thoroughly flushed with nitrogen, and 80 g of $[CF_3(CF_2)_3C_2H_4(CH_3)SiO]_3$, 120 g of $[(CH_3)_2SiO]_4$ and 6.1 g of $(CH_3)_3SiOSi(CH_3)_3$ were introduced. The internal temperature was maintained at 50° C., and 100 mg of $CF_3SO_3H$ was introduced. Four hours later, 1.2 g of $NaHCO_3$ was introduced to terminate the reaction. The reaction product was subjected to filtration to remove $NaHCO_3$, and then low boiling substances were removed by distillation at 180° C. under 3 mmHg. The obtained product was analyzed by a NMR spectrum method and an infrared spectrometry, whereby it was confirmed to have a structure of the formula (8). The viscosity of the product was 110 cP, and the contact angle to PFA was 3°.

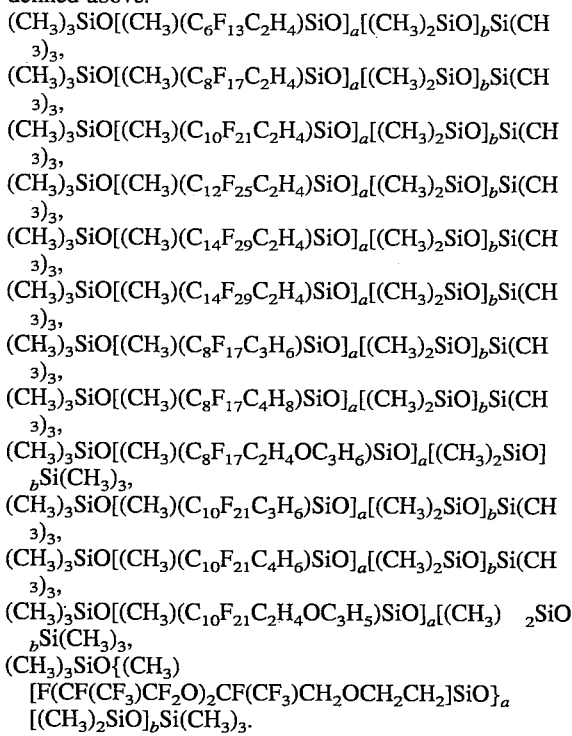

(8)

PREPARATION EXAMPLE 2

Using 100 g of $[CF_3(CF_2)_7CH_2CH_2(CH_3)SiO]_3$, 58.5 g of $[(CH_3)_2SiO]_4$ and 3.2 g of $(CH_3)_3SiOSi(CH_3)_3$, a compound of the formula (9) was prepared in the same manner as in Preparation Example 1. The viscosity of the product was 130 cP, and the contact angle to PFA was 2.8°.

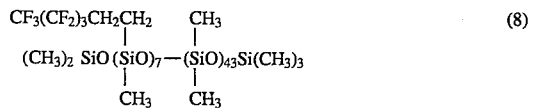

(9)

PREPARATION EXAMPLE 3

Using 100 g of $[CF_3(CF_2)_{11}CH_2CH_2(CH_3)SiO]_3$, 41.9 g of $[(CH_3)_2SiO]_4$ and 2.29 g of $(CH_3)_3SiOSi(CH_3)_3$, a compound of the formula (10) was prepared in the same manner as in Preparation Example 1. The viscosity of the product was 140 cP, and the contact angle to PFA was 2.5°.

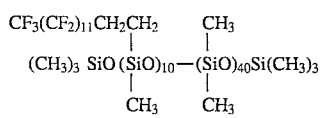
(10)

PREPARATION EXAMPLE 4

Using 100 g of a mixture comprising [CF$_3$(CF$_2$)$_7$CH$_2$CH$_2$(CH$_3$)SiO ]$_3$, [CF$_3$(CF$_2$)$_9$CH$_2$CH$_2$(CH$_3$)SiO]$_3$ and [CF$_3$(CF$_2$)$_{11}$CH$_2$CH2(CH$_3$)SiO]$_3$ in a molar ratio of 9:3:1, 71.6 g of [(CH$_3$)$_2$SiO]$_4$ and 3.92 g of (CH$_3$)$_3$SiOSi(CH$_3$)$_3$, a fluorosilicone compound was prepared in the same manner as in Preparation Example 1. The viscosity of the product was 150 cP, and the contact angle to PFA was 2°.

PREPARATION EXAMPLE 5

Using 183 g of [CF$_3$(CF$_2$)$_3$CH$_2$CH$_2$O(CH$_2$)$_3$(CH$_3$)SiO]$_3$, 100 g of [(CH$_3$)$_2$SiO]$_4$ and 6.1 g of (CH$_3$)$_3$SiOSi(CH$_3$)$_3$, a compound of the formula (11) was prepared in the same manner as in Preparation Example 1. The viscosity of the product was 150 cP, and the contact angle to PFA was 5°.

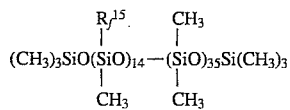
(11)

In the formula (11), R$_f^{14}$ is CF$_3$(CF$_2$)$_3$CH$_2$CH$_2$O(CH$_2$)$_3$—.

PREPARATION EXAMPLE 6

Using 438 g of [F(CF(CF$_3$)CF$_2$O)$_2$CF(CF$_3$)CH$_2$OCH$_2$CH$_2$CH$_2$(CH$_3$)SiO]3, 84 g of [(CH$_3$)$_2$SiO]$_4$ and 6.1 g of (CH$_3$)$_3$SiOSi(CH$_3$)$_3$, a compound of the formula (12) was prepared in the same manner as in Preparation Example 1. The viscosity of the product was 210 cP, and the contact angle to PFA was 5°.

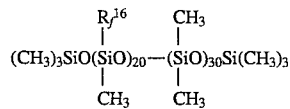
(12)

In the formula (12), R$_f^{16}$ is F[CF(CF$_3$)CF$_2$O]$_2$CF(CF$_3$)CH$_2$OCH$_2$CH$_2$CH$_2$—. EXAMPLES 1 TO 6

Copying was carried out while continuously applying the fluorosilicone compound obtained in one of Preparation Examples 1 to 6 onto a heat fixing roller coated with PFA. The number of copied sheets until an offset phenomenon appeared, was counted.

| Examples | Example 1 Fluorosilicone compound | Number of copied sheets |
|---|---|---|
| 1 | Preparation Example 1 | 200,000 |
| 2 | Preparation Example 2 | 250,000 |
| 3 | Preparation Example 3 | 240,000 |
| 4 | Preparation Example 4 | 200,000 |
| 5 | Preparation Example 5 | 180,000 |
| 6 | Preparation Example 6 | 200,000 |

EXAMPLES 7 TO 12

Copying was carried out while continuously applying the fluorosilicone compound obtained in one of Preparation Examples 1 to 6 onto a heat fixing roller having a silicone rubber surface. Copying was continued without changing the roller, whereby no offset phenomenon was observed even when the number of copied sheets reached 200,000 sheets.

COMPARATIVE EXAMPLE

Copying was carried out under the same conditions as in Examples 7 to 12 except that dimethylsilicone oil having a structure of the formula (13) was applied instead of the fluorosilicone compounds used in Examples 7 to 12. The viscosity of the dimethylsilicone oil was 100 cP, and the contact angle to PFA was 40°. The number of copied sheets until the change of the heat fixing roller became necessary, was 50,000 sheets.

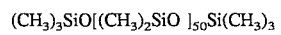
(13)

The stainproofing oil for a heat fixing roller of the present invention has excellent stainproofing effects, whereby copying can be carried out on a far more number of copy paper sheets as compared with conventional oil, without an offset phenomenon.

Especially when the fluorosilicone oil of the present invention is applied to a heat fixing roller having a silicone rubber surface, it does not swell the heat fixing roller, whereby the life of the roller can substantially be prolonged. Further, as compared with conventional oil, copying can be carried out on a far more number of copy paper sheets without an offset phenomenon.

Further, also in a case where the stainproofing oil for a heat fixing roller of the present invention is applied to a heat fixing roller having a fluorine resin surface, it has excellent wettability to the roller, whereby it can be applied uniformly over the roller surface, and the offset phenomenon can be prevented over a long period of time.

What is claimed is:

1. A heat fixing roller coated with a stainproofing oil which consists essentially of a fluorosilicone compound having a silicon atom to which a monovalent fluorine-containing group selected from the formulae (1) to (3) is bonded:

$$R_f^1—X^1— \quad (1)$$

$$R_f^2—X^2—O—X^3— \quad (2)$$

$$R_f^3—X^4—O—X^5— \quad (3)$$

wherein $R_f^1$ is a monovalent polyfluorohydrocarbon group of the formula $CF_3(CF_2)_n$—wherein n is an integer of from 3 to 13, $R_f^2$ is a monovalent polyfluoroalkyl group containing an ether oxygen atom $R_f^3$ is a monovalent polyfluorohydrocarbon group and each of $X^1$ to $X^5$ independently is a bivalent hydrocarbon group.

2. A method for stainproofing a heat fixing roller, which comprises applying to the surface of the heat fixing roller, a fluorosilicone compound having a silicon atom to which a monovalent fluorine-containing group selected from the formulae (1) to (3) is bonded:

$$R_f^1—X^1— \quad (1)$$

$$R_f^2—X^2—O—X^3— \quad (2)$$

$$R_f^3—X^4—O—X^5— \quad (3)$$

wherein $R_f^1$ is a monovalent polyfluorohydrocarbon group of the formula $CF_3(CF_2)_n$—wherein n is an integer of from 3 to 13, $R_f^2$ is a monovalent polyfluoroalkyl group containing an either oxygen atom, $R_f^3$ is a monovalent polyfluorohydrocarbon group, and each of $X^1$ to $X^5$ independently is a bivalent hydrocarbon group.

3. The method for stainproofing a heat fixing roller according to claim 2, wherein the formula (1) is represented by the formula (4):

$$CF_3(CF_2)_n—X^6— \quad (4)$$

wherein n is an integer of from 3 to 13, and $X^6$ is a $C_{1-10}$ alkylene group.

4. The method for stainproofing a heat fixing roller according to claim 2, wherein the formula (2) is represented by the formula (5):

$$F[CF(CF_3)CF_2O]_mCF(CF_3)—X^7—O—X^8— \quad (5)$$

wherein m is an integer of from 1 to 10, and each of $X^7$ and $X^8$ independently is a $C_{1-10}$ alkylene group.

5. The method for stainproofing a heat fixing roller according to claim 2, wherein the formula (3) is represented by the formula (6):

$$CF_3(CF_2)_k—X^9—O—X^{10}— \quad (6)$$

wherein k is an integer of from 0 to 17, and each of $X^9$ and $X^{10}$ independently is a $C_{1-10}$ alkylene group.

6. The method for stainproofing a heat fixing roller according to claim 2, wherein the fluorosilicone compound is of the formula (7):

$$(R^{10})_3SiO(SiO)_a\underset{\underset{R^{11}}{|}}{\overset{\overset{R_f^{14}}{|}}{|}}—(SiO)_bSi(R^{10})_3 \underset{\underset{R^{13}}{|}}{\overset{\overset{R^{12}}{|}}{|}} \quad (7)$$

wherein $R^{10}$ is a lower alkyl group, each of $R^{11}$ to $R^{13}$ independently is a lower alkyl group or a monovalent aromatic hydrocarbon group, a is an integer of at least 1, b is an integer of 0 or at least 1, and $R_f^{14}$ is a monovalent fluorine-containing group selected from the formulae (1) to (3).

7. The method for stainproofing a heat fixing roller according to claim 2, which is used for a heat fixing roller having a silicone rubber surface or a fluorine resin surface.

8. The method for stainproofing a heat fixing roller according to claim 2, wherein the heat fixing roller is a heat fixing roller for a copy machine or a printing machine.

\* \* \* \* \*